(No Model.)   3 Sheets—Sheet 1.

J. V. STRIBLING.
TRACTION ENGINE.

No. 259,600. Patented June 13, 1882.

WITNESSES
Thos Houghton.
John Brodie

INVENTOR
John V. Stribling
Per Ireland & Singleton
Attorneys

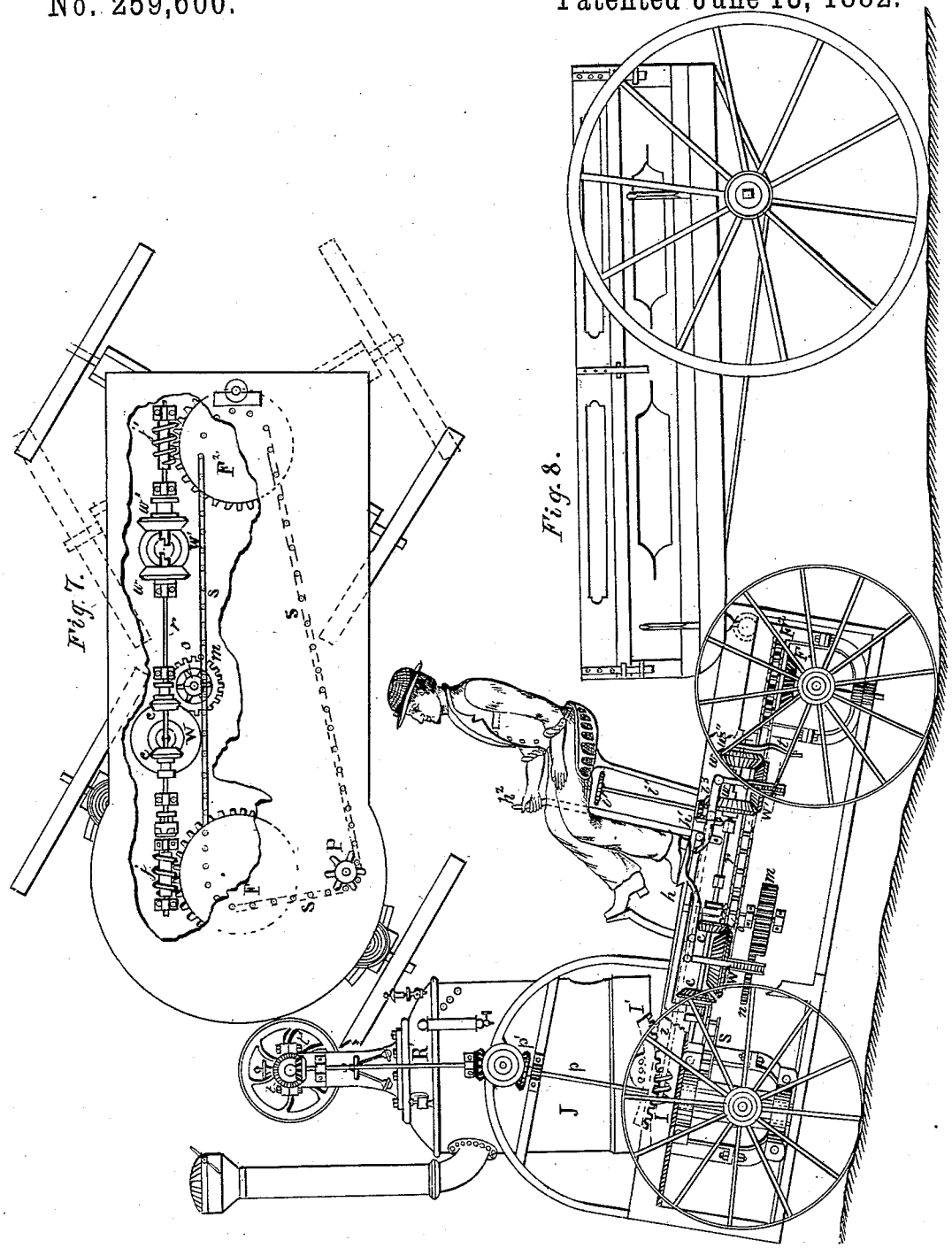

(No Model.) 3 Sheets—Sheet 3.
J. V. STRIBLING.
TRACTION ENGINE.

No. 259,600. Patented June 13, 1882.

Witnesses
Inventor
John V. Stribling
Per Ireland & Singleton
attys

UNITED STATES PATENT OFFICE.

JOHN V. STRIBLING, OF WESTMINSTER, SOUTH CAROLINA.

TRACTION-ENGINE.

SPECIFICATION forming part of Letters Patent No. 259,600, dated June 13, 1882.

Application filed March 29, 1882. (No model.)

*To all whom it may concern:*

Be it known that I, JOHN V. STRIBLING, of Westminster, in the county of Oconee and State of South Carolina, have invented certain Improvements in Machinery for Transmitting Power, Propelling Traction-Engines, &c., of which the following is a specification.

This invention relates, first, to certain improvements in mechanical movements, whereby the power of any motor may be communicated for driving machinery in any direction. It also relates to the application of these improvements to traction-engines which can be applied to agricultural machines to be driven by steam. The same may be applied for the propulsion of vessels. It also relates to certain devices connected with the driving-pulley of the motor, or with a driving-shaft connected with it, whereby a road-engine or a vessel which may have the improvement can be automatically directed or steered, all of which will be more fully described, and set forth in the claims.

Figure 1:
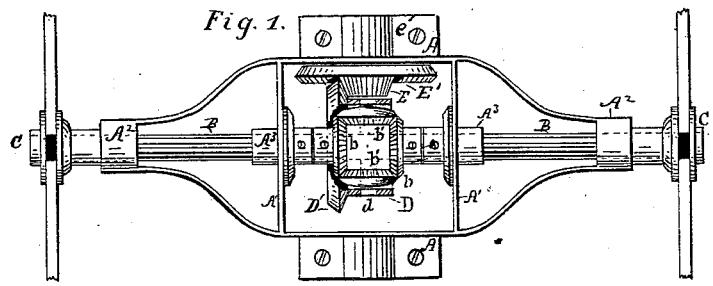
Figure 2:
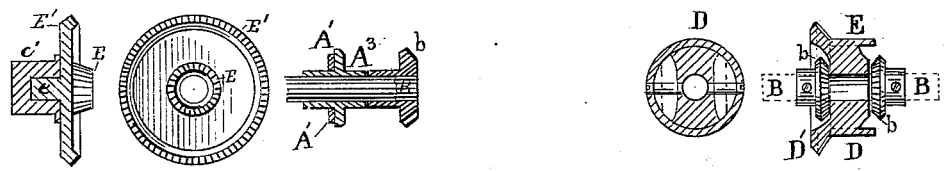
Figure 3:
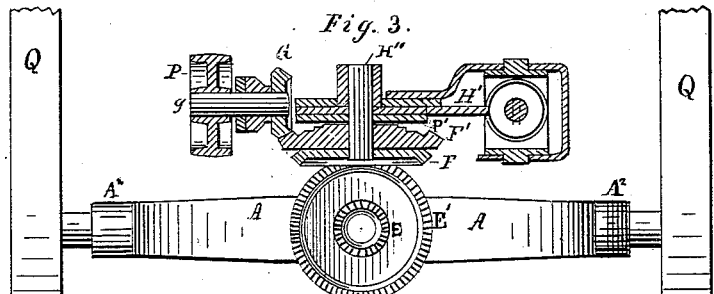
Figure 4:
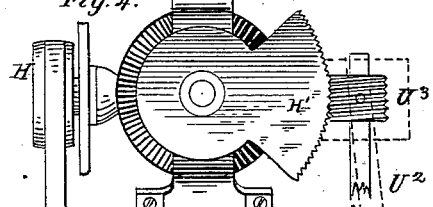
Figure 6:
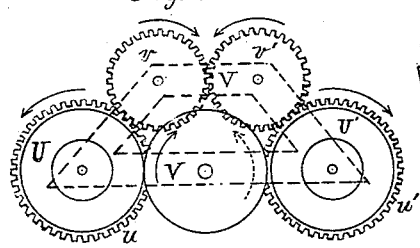
Figure 5:
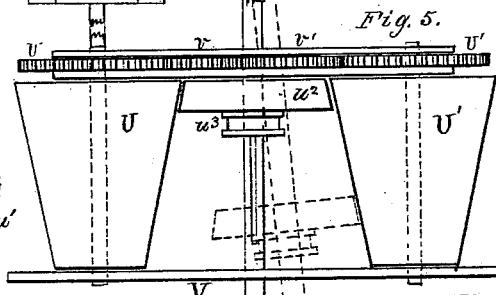
Figures 9, 10, 11:
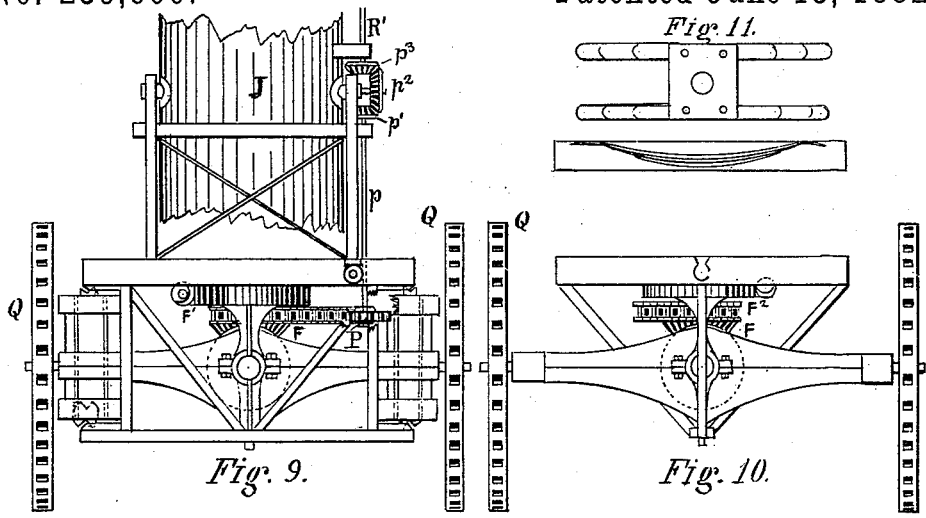
Figures 12, 13:
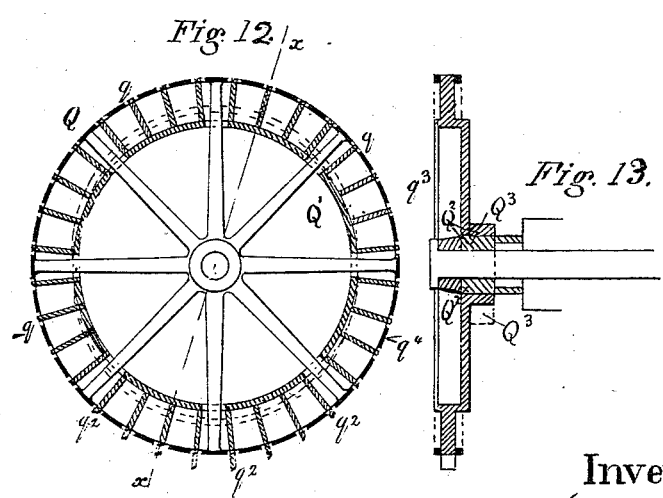

Figure 1 is a longitudinal horizontal view through the axles of a pair of wheels, showing the gearing whereby the motion of the driving-engine is communicated to the axles. Fig. 2 shows a series of detached parts of Fig. 1, which will be referred to in the general description. Fig. 3 is a vertical longitudinal section, showing the driving-pulley and shaft connected with the gearing in Fig. 1. Figs. 4 and 5 show a horizontal view of the automatic steering apparatus. Fig. 6 is an end view of the gearing of the cones in Fig. 5. Fig. 7 is a horizontal view of a traction-engine with the improved machinery. Fig. 8 is a side elevation of Fig. 7 with a common wagon attached to it. Fig. 9 is a front view of the boiler and traction-engine. Fig. 10 is a rear view of the same with boiler removed; Fig. 11, details of springs and bolster-frame; Fig. 12, the front view and section of a traction-wheel; Fig. 13, a vertical section on line $xx$ of Fig. 12.

A is a frame of metal, forming a broad axle-bearing bed, which has cross-beams A' A', forming a rectangular space, and in which are located several parts of the improvements in gearing, which constitute the mechanical movements as applied particularly for moving the axles of a road-engine. Beyond these cross-beams A' A', at the ends of the frame A, are sleeves $A^2 A^2$, in which are supported the two axles B B of the wheels. The inner ends of axles B B are also supported in sleeve-bearings $A^3 A^3$ in the cross-beams A' A'. On the inner ends of axles B B are beveled gears $b\ b$, which gear with two idler beveled wheels, $b'\ b'$, pivoted within a circular box, D, by screw-bolts $d\ d$.

On one side of box D is a vertical beveled wheel, D', which meshes with a beveled pinion, E, which is on the face of a vertical beveled wheel, E', supported in a sleeve-bearing, $e$, in the frame A. In Fig. 2, to the left, is a section of this wheel E', showing the journal $e$ in bearing $e'$. In Fig. 3 the beveled wheel F, which is horizontal, gears with the vertical wheel E'.

In the top of wheel F, and forming part of it, is another beveled gear, F', which gears with a smaller vertical wheel, G, on a shaft, $g$, on the other end of which shaft $g$ is a pulley, H, which can be connected by a driving-band to the main driving-pulley of the engine; or it may be the crank-wheel connected to a pitman-bar of the engine, which engine may be placed on a platform on frame A, or on the frame A itself, and the axles of another pair of wheels, as represented in Figs. 7 and 8, in which latter case the whole is set in motion by the vertical shaft R', as shown in Figs. 8 and 9, and which will be more fully hereinafter described, as also will be described the gimbal-bearings of the wheels F' F.

When the pulley H is set in motion (see Figs. 1 and 3) it will drive wheels G, F', F, E', E, and D'.

The traction-wheels Q Q are fastened to the axles B B, which are supported in the axle-frame A, as before described.

The beveled wheels $b\ b$ on the inner ends of axles B B mesh with the idler-pinions $b'\ b'$, heretofore described as being pivoted in the box D.

Either axle B can be rotated by means of the gearing by which it is connected to the driving-pulley H in Fig. 3, or to the vertical shaft $p$, Figs. 8 and 9, or any other device whereby it can be connected to the engine, should the other axle by any means be stopped, because these axles B B are independent of each other, and should one wheel be checked in steering the speed and force of the other wheel will not necessarily be affected thereby, but by means of the idlers $b'\ b'$ will continue its rotation, as these idlers $b'\ b'$ will roll with either wheel $b\ b$ that is in motion and roll around the stationary one.

When wheel D is stationary the two traction-wheels connected therewith can be moved at the same time, but always in a contrary direction, by means of the two idler-wheels $b'\ b'$, as before described.

The driving-engine and boiler are placed above the axle-frame and supported on gimbals, so that whatever may be the inclinations of the axles the engine and boiler may be kept plumb and level, as seen in Fig. 8, by means of the arrangement of a spiral screw, I, and segment-rack I′, which are operated by a shaft, $i$, and hand-wheel $i'$ and rod $i^2$ with beveled gear $i^3$. By this arrangement the driver can secure the plumb of the boiler and engine and prevent oscillation by reason of the motion of the wagon. The distance across the wagon being small, a slight alteration of level transversely will not affect the boiler.

In Fig. 8 the side view of the traction-engine shows a connection between the forward traction-wheels and the rear wheels by means of a sprocket-chain, S, which is operated as follows: In Fig. 7, P is a sprocket-wheel which is at the bottom of a vertical shaft, $p$, on the top of which shaft $p$ is a beveled gear, $p'$, which, by means of beveled wheels $p^2\ p^3$, receives motion from the shaft R′, hereinbefore referred to, which shaft R′ is connected by beveled gears $t\ t'$ with the engine, which is not shown in the drawings, as it is obvious how that can be placed, like the Baxter engine, and which forms no part of my invention. The sprocket-wheel P gives motion to the chain S, which passes around a larger sprocket-wheel, F′, (shown in Fig. 7 in plan,) and in Fig. 3 takes the place of wheel F′, which, as before described, receives motion from the beveled gear G, &c., which is used for a single-geared machine for working only one set of wheels. When, however, all the wheels of the trucks are desired to be made tractive, then the sprocket-wheels and chain arrangement must be employed. The chain S also operates a sprocket-wheel, O, on the same shaft with and above a spur-gear wheel, $m$, for a purpose which will be hereinafter described.

Over the axles of the rear wheels is another sprocket-wheel, F², around which the chain S passes, and it also bears the same relation to the other gear-wheels on that end (which are similarly arranged as those over the front axles, B B, and wheels) as sprocket-wheel F′ does to the front end axles and wheels—that is, by the revolution of these sprocket-wheels F′ and F² the gearing, as heretofore described, on both pairs of traction-wheels is set in motion, and the axles B B, with all four of the wheels, are caused to rotate and propel the vehicle in the direction required.

The chain S, as was before stated, passes over the sprocket-wheel O, on the shaft of which, situated below it, is a spur-gear, $m$, with a wide periphery to admit of long cogs, so that the spur-gear wheel $n$, which meshes with $m$, can be moved vertically a certain distance and keep in gear with it.

On the same shaft with wheel $n$, and above it, is a friction cone-wheel, W, adjusted in a movable frame which is operated by a foot-lever, $h$. Connected with this cone-wheel W are two cone-wheels, $c\ c'$, on a horizontal shaft, $r$, which has at its forward end a worm-gear, $j$, which works into a segment-rack, H′, which is secured to the axle-frame of the forward wheels. Shaft $r$ extends longitudinally to the rear of the vehicle, and has at its rear end a beveled cone, $w$.

A beveled cone, $w'$, is sustained in a sliding frame, similar to the cone W at the forward end, and is moved vertically by a foot-lever, $h'$.

Opposite to cone-wheel $w$ is a similar cone-wheel, $w'$, on a short shaft, $r'$, on the end of which $r'$ is a worm-gear, $j'$, with its spiral reversed to that of the front worm-gear, $j$. This worm-gear works in with a segment-rack, H², similarly arranged to the one at the front end.

Immediately behind the cone-wheel $w'$ is a strong spring, $t$, which presses against the cone-wheel $w'$, so that $w'$ is kept in contact with wheel $w$ by means of the clutch $w^2$, except when the horizontal cone-wheel W′ is raised up and forces wheel $w'$ away from $w$. The operation of this arrangement is to change the direction of the traction-wheels as follows: The chain S being put in motion causes the front and rear traction-wheels to rotate and carry the vehicle forward. When the friction-cones W and W′ are not in contact with the smaller cones on the shaft $r$ that shaft does not rotate, and the vehicle moves directly forward in either direction required. When the vehicle is to be moved to right or left obliquely, as indicated in Fig. 7 by the wheels in solid lines, by means of the hand-lever $h^2$ the operator can move either of these small cones $c\ c'$ on the shaft $r$ into contact with cone W, which is kept constantly in motion by means of the sprocket-wheel O, operating spur-gears $m$ and $n$.

It will be seen that whichever cone $c\ c'$ on shaft $r$ is in gear, motion correspondingly will be given to shaft $r$ and its worm-gear $j$, which will turn the segment-rack H′ and the forward traction-wheels correspondingly, and by means of the beveled cones $w$ and $w'$ at the other end of shaft $r$ the worm-gear $j'$ will turn the segment-rack H² and the rear wheels, as shown in Fig. 7 in solid lines.

To turn the vehicle around the forward wheels will be turned as shown in Fig. 7, and by using the foot-lever $h'$ and elevating the cone W′ so as to force apart the cones $w$ and $w'$ the cone $w$ gives motion to the cone W′, and it moves $w'$ in a contrary direction, and thus causes the traction-wheels to take the position shown in broken lines and causes the vehicle to be rapidly turned around.

The cones W and W' are so arranged that they can be elevated to engage the smaller cones on the shaft $r$ at varying diameters, thus changing the speed of turning between the lowest and highest, according to the beveled surface of the cones.

Fig. 9 shows the manner of constructing the forward end of the vehicle represented in Fig. 8 and the springs used to support the weight of the boiler J and engine; also there is seen on the right side the vertical shaft $p$ and gearing above it, by which it is moved by the engine above the boiler, and below is also seen the sprocket-wheel P, engaging the chain S, which passes around the sprocket-wheel F', and below it the beveled-gear wheel F, which communicates motion to the gear-wheels shown in Figs. 1 and 3, as hereinbefore described.

Fig. 10 shows the same arrangement of sprocket-wheel $F^2$ over the rear axle-frame and the beveled wheel F below, which gives motion to the same character of gearing for operating the rear wheels as hereinbefore described.

When the motor for driving a vehicle is placed only on one pair of wheels, as shown in Fig. 3, and hereinbefore described, the method of steering by means of friction-cones is illustrated in Fig. 5 as follows: Two cones, U U', are axled in a frame, V, and operated by means of a train of cog-wheels, as seen in Fig. 6. Any convenient gearing may be used to give motion to one of the cog-wheels from the moving gears in Fig. 4, as $u$, the one on cone U, moving in direction of the arrow, which will turn $v$ $v'$, and finally $w'$, in the opposite direction to $u$. Between these cones is a rotary shaft, $U^2$, on which is a sliding cone, $u^2$, having attached to it a clutch, $u^3$. This shaft $U^2$ has at one end a worm-gear, $U^3$, which works into a segment-rack, H', rigidly attached to the main platform-frame over the axle of the wagon. To the clutch $u^3$ there is a lever by which the clutch and cone $u^2$ can be moved along the shaft $U^2$, and by means of the spline on the shaft the cone $u^2$ becomes fixed to the shaft and rotates with it. There is a horizontal play allowed to the shaft $U^2$ transversely, so that the operator can move the shaft to right or left, as seen in broken lines in Fig. 5. At the same time the cone can be moved along the shaft to any point within the frame, either to right or left, as shown in Fig. 5 in broken lines. By this latter movement the cone can be adjusted to give different speeds to the shaft $U^2$, and by moving the shaft to one cone or the other turn it and the worm-gear to the right or left, as may be required to turn the vehicle.

In Fig. 5 a hand-wheel is shown on the shaft $U^2$, so that a person walking can steer the wagon. For this method of steering I purpose making a separate application for a patent.

Great difficulties have been encountered in traction engines or wagons on common roads moved by steam in getting proper driving-wheels which would have sufficient friction with the ground to produce the proper amount of traction. Ordinarily very heavy and cumbersome wheels have to be used, and the peripheries have permanent or fixed roughened surfaces, which are inconvenient, except in soft ground, and these soon become filled with the soft earth and are useless.

In Figs. 14 and 15 is represented a wheel with certain improvements, whereby I am able to use a much lighter wheel and yet produce all the traction necessary for locomotion. The outer tire, Q, is of wrought metal, which is supported on the usual number of spokes from the hub, made in due proportion and strength. Inside of this tire is a metal wheel of the form shown in section in Fig. 15, having a rim, Q', from which project at regular intervals what I term "turtle-heads" $q^2$, and in the outer tire of the wheel Q are orifices $q$ through which these turtle-heads $q^2$ protrude. This inner wheel has its hub $Q^2$ fitted to an eccentric, $Q^3$, which is fastened around the axle of the wheel and to the axle-bearings on the frame.

In Fig. 14 the inner wheel, Q', is represented as being concentric with the tire in solid lines, but eccentric in broken lines. In Fig. 15 the eccentric $Q^3$ is also shown in section through its concentric portion in solid lines, to correspond with Fig. 14, but in broken lines below is shown its eccentric section.

As the wheel is made to rotate, the inner wheel, Q', moving around the eccentric $Q^3$, will cause the turtle-heads $q^2$ to protrude through the outer rim or tire, as seen at the bottom in broken lines, and by this action these heads will take hold of the ground and produce traction. The eccentric $Q^3$ is so arranged in its construction that it can be adjusted in such a position as to cause these turtle-heads to project at any side of the wheel—as, for instance, if the vehicle is to be moved over very hard ground, they may protrude at the top and the wheel be smooth where it rolls over the ground; and the same may be done on either side.

The orifices in the rim of the outer wheel, Q, are made long enough to allow for the movement of the inner wheel, Q', and the orifices $q$ in the inner wheel, through which the spokes of the outer wheel pass, are also made large enough to allow for the movement of the wheel Q' around the eccentric.

The inner wheel is made open on the side next to the large wheel, which opening is covered by a plate, $q^3$, after the two wheels are put together, as shown in Fig. 15.

A scraper, $q^4$, is attached to the vehicle-frame immediately in contact with tire Q at $q^4$, which will scrape off any adhering earth.

The wheel F F' is centered around the king-bolt of the frame which bears the boiler and engine, and below the bed-plate, as seen in section, Fig. 3. This plate is supported on a stirrup or gimbal which has its bearings around the sleeve-bearings, in which is centered the journal of the vertical wheel E'. It is therefore evident that the center around which the wheel E' revolves is also the center of any transverse motion of the axles of the traction-wheels, as they may be elevated or depressed in the cross-section of the road along which the vehicle may travel. By this arrangement of a common center of movement of the wheels transversely of the road and the rotation of the wheel E' around its center as it is moved by the horizontal wheel F' F, it is provided that this contact shall always continue, whatever may be tilting crosswise of the traction-wheels as they are driven along a sloping cross-section of any road.

The boiler and engine will be level with the bed-plate to which they are attached, or nearly so, while the wheel may be very much tilted, and yet the driving-wheel F F' will continue in gear and operate upon wheel E', and through its pinion E continue the motion of wheel D' and box D, whereby the wheels are operated continuously, whatever irregularities there may be in the cross-sections of the road along which the vehicle may be driven. This arrangement constitutes a part of my invention.

I claim—

1. In machines for operating traction-engines, the combination of the vertical wheel E' and pinion E with the horizontal wheel F', supported in the gimbal, whose center of motion is in a line with the center of wheel E', whereby at any transverse tilting of the wheels the wheels E' and D' remain in gear, substantially as and for the purpose described.

2. The combination of the driving-wheels F' F, wheel and pinion E' E, wheel D', box D, with its loose wheels $b'$ $b'$, and beveled wheels $b$ $b$ with the shafts or axles B B, substantially as and for the purpose described.

3. In machines for operating traction-engines, the combination of the sprocket-wheels P F' F$^2$, chain S, beveled wheels F' F, wheels E', E, and D', with the box D with interior loose wheels $b'$ $b'$, and beveled gears $b$ $b$ on the shaft or axles of the four traction-wheels, substantially as and for the purpose described.

4. The combination of the sprocket-chain S, sprocket-wheel O, spur-gears $m$ and $n$, friction-cones W, $c$, and $c'$, worm-gear $j'$ $j'$, and segment-rack I', whereby the wheels are turned in steering, substantially as and for the purpose described.

5. The combination of the sprocket-chain S, the sprocket-wheel O, spur-gears $m$ and $n$, friction-cones W, $c$, and $c'$, cones $w$ W' $w'$, and worm-gear whereby the rear wheels are steered, substantially as and for the purpose described.

6. The combination of the exterior wheel, Q, having in its tire a series of orifices, the interior wheel, Q', provided with a series of projecting turtle-heads, $q^2$, to protrude through the orifices in exterior wheel, Q, and the adjustable eccentric Q$^3$ on the axle of a traction-engine, all substantially as and for the purpose described.

JOHN V. STRIBLING.

Witnesses:
JOHN D. VERNER,
W. C. ENIS.